UNITED STATES PATENT OFFICE.

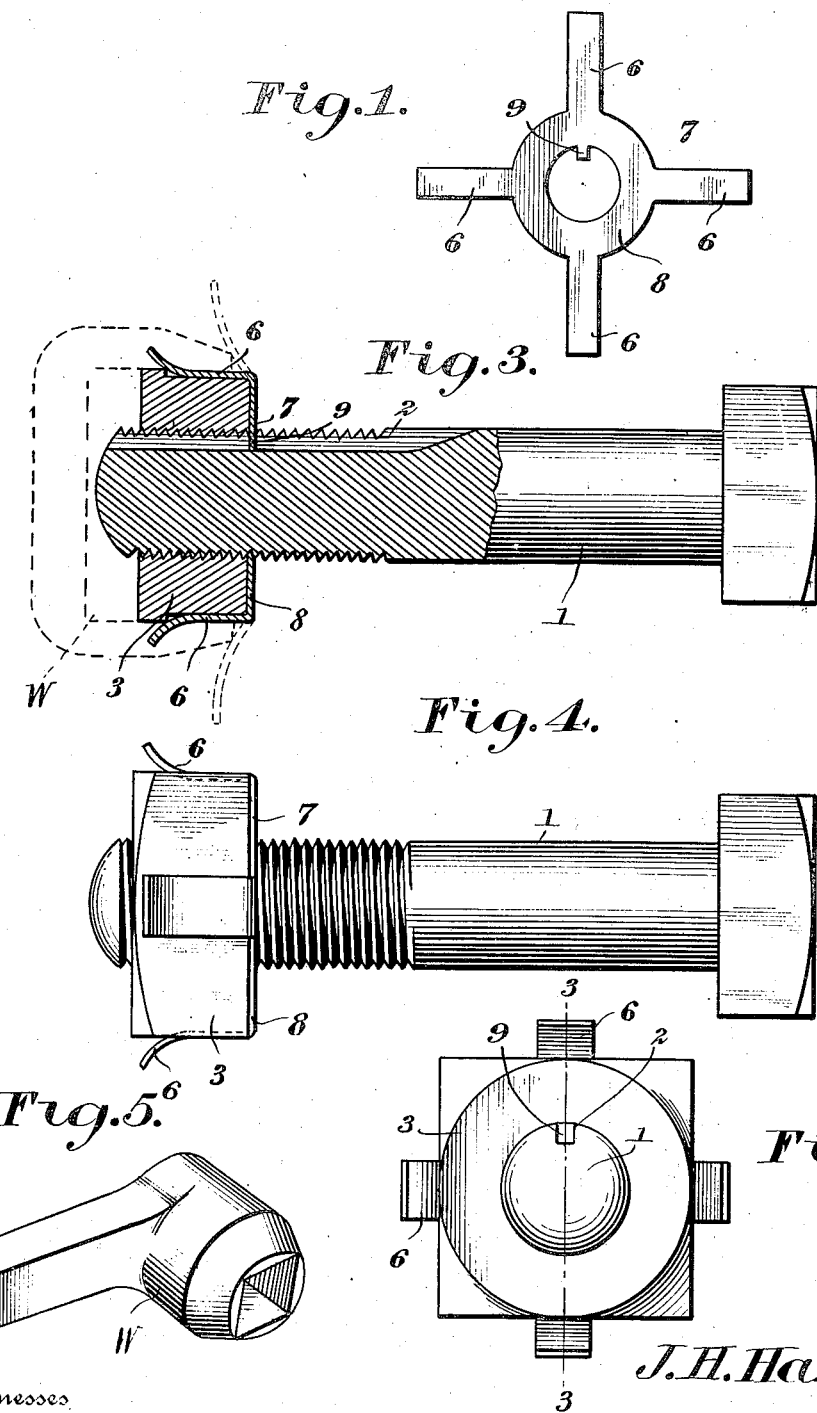

JOHN H. HAZEL, OF LOCKPORT, NEW YORK.

NUT-LOCK.

1,183,729. Specification of Letters Patent. Patented May 16, 1916.

Application filed December 29, 1914. Serial No. 879,529.

*To all whom it may concern:*

Be it known that I, JOHN H. HAZEL, a citizen of the United States, residing at Lockport, in the county of Niagara and State of New York, have invented new and useful Improvements in Nut-Locks, of which the following is a specification.

The present invention relates to improvements in means for locking a nut upon a bolt, and resides in the construction, combination and operation of parts set forth in the following specification and falling within the scope of the appended claim.

In the drawing: Figure 1 is a plan view of the locking element constructed in accordance with the present invention, Fig. 2 is a similar view but illustrating the device arranged upon a nut and bolt, Fig. 3 is a transverse sectional view on the line 3—3 of Fig. 2, and Fig. 4 is a side elevation of the same. Fig. 5 is a perspective view of a tool used in connection with my invention.

Referring now to the drawings in detail 1 designates a bolt of the ordinary construction having its shank provided with a longitudinally extending channel 2, which intercepts its threads.

3 designates a nut for the bolt. This nut is of the ordinary or usual construction, except that the same has its sides or faces provided with longitudinally extending grooves which are parallel with the axial plane of the bore of said nut. The grooves are of a width corresponding with the radial arms 6 provided upon a locking device 7. This locking device includes a flat rounded portion or body 8 having a central bore provided with an inwardly projecting lug 9 that is adapted to extend into the channel of the bolt, and the arms of the said member are adapted to be bent within the longitudinal grooves upon the faces of the nut. Preferably and as illustrated in the drawings, the arms of the locking element have their ends outturned so that the same do not contact with the inner walls of the grooves, and whereby a wrench W shown in Fig. 5 having an inner periphery which corresponds in shape to the substantially rectangular nut and an outer periphery which is preferably round in cross section may be readily inserted inside the outturned ends of the locking element to force the prongs or arms of the same out of contact with the walls of the grooves in the nut and permit of the ready removal of the nut from the bolt.

From the above description, taken in connection with the accompanying drawing, the simplicity of the device as well as the advantages thereof will, it is thought, be perfectly apparent to those skilled in the art to which such invention appertains without further detailed description.

Having thus described the invention, what I claim is:

A nut lock consisting of a threaded bolt, said bolt being formed with a longitudinal groove intersecting the threaded portion, a nut engaging the threaded portion of said bolt, said nut being formed upon each of its sides with a groove having its outer edge spaced inwardly from the outer face of the nut whereby each groove will be of a lesser length than the surface upon which it is formed, and a locking member consisting of a rounded portion having an opening through which the bolt may be passed, said circular portion being formed with an inturned lug adapted to take into the groove of said bolt and be guided therein, and a plurality of radially extending arms formed upon said rounded portion, said rounded portions adapted to engage the back of said nut and having their arms bent substantially at right angles to their length and with their bent portions disposed partly in each of said grooves, each of said bent arms being deflected outwardly of the nut at the innermost edge of each groove whereby to provide means for deflecting said arms from the grooves.

MR. JOHN H. HAZEL.